(12) United States Patent
Baltes et al.

(10) Patent No.: US 10,465,832 B2
(45) Date of Patent: Nov. 5, 2019

(54) DAMPING DEVICE

(71) Applicants: HYDAC TECHNOLOGY GMBH, Sulzbach/Saar (DE); AIRBUS OPERATIONS GMBH, Hamburg (DE)

(72) Inventors: Herbert Baltes, Losheim (DE); Peter Kloft, Ransbach-Baumbach (DE); Alexander Wohlers, Saarburg (DE); Robert Marinus Behr, Weyhe (DE); Simon MacLennan, Bremen (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 15/542,671

(22) PCT Filed: Dec. 23, 2015

(86) PCT No.: PCT/EP2015/002618
§ 371 (c)(1),
(2) Date: Jul. 11, 2017

(87) PCT Pub. No.: WO2016/112947
PCT Pub. Date: Jul. 21, 2016

(65) Prior Publication Data
US 2017/0356585 A1    Dec. 14, 2017

(30) Foreign Application Priority Data
Jan. 14, 2015    (DE) .................. 10 2015 000 418

(51) Int. Cl.
*F16L 55/045* (2006.01)
*F01N 1/10* (2006.01)
(Continued)

(52) U.S. Cl.
CPC ............ *F16L 55/045* (2013.01); *F01N 1/023* (2013.01); *F01N 1/026* (2013.01); *F01N 1/082* (2013.01);
(Continued)

(58) Field of Classification Search
CPC ............... F16L 55/045; F16L 55/02763; F16L 55/02727; F16L 55/02781;
(Continued)

(56) References Cited

U.S. PATENT DOCUMENTS 822,127  A  *  5/1906  Hufnagel .......... F16L 55/02781
                                                181/239
2,401,570  A     6/1946  Koehler
(Continued)

FOREIGN PATENT DOCUMENTS

DE         944 405       6/1956
DE         102 17 080    8/2003
(Continued)

OTHER PUBLICATIONS

International Search Report (ISR) dated Apr. 6, 2016 in International (PCT) Application No. PCT/EP2015/002618.

*Primary Examiner* — Matthew W Jellett
(74) *Attorney, Agent, or Firm* — Wenderoth, Lind & Ponack, L.L.P.

(57)     ABSTRACT

A damping device, in particular for damping or preventing pressure impacts, like pulsations, in hydraulic supply circuits has a damping housing (1) surrounding a damping chamber with a fluid inlet (13) and a fluid outlet (15). A damping tube (21; 51) is located in the flow path between the damping inlet and outlet and has a branch opening (29; 73, 75, 77, 79, 81) passing through the tube wall and leading to a Helmholtz volume (27; 53, 55, 57, 59, 61) inside of the damping housing (1) forming a Helmholtz resonator in a region positioned inside of the length of the damping tube. A fluid filter (35) is arranged inside of the damping housing (1) in the flow path between the fluid inlet (13) and fluid outlet (15).

16 Claims, 2 Drawing Sheets

(51) Int. Cl.
*F17D 1/20* (2006.01)
*F01N 1/08* (2006.01)
*F01N 1/02* (2006.01)
*F16L 55/027* (2006.01)
*F15B 21/041* (2019.01)
*F15B 21/00* (2006.01)

(52) U.S. Cl.
CPC .......... *F01N 1/10* (2013.01); *F16L 55/02727* (2013.01); *F16L 55/02763* (2013.01); *F16L 55/02781* (2013.01); *F17D 1/20* (2013.01); *F15B 21/008* (2013.01); *F15B 21/041* (2013.01); *F15B 2211/615* (2013.01); *Y10T 137/0396* (2015.04)

(58) Field of Classification Search
CPC .............. F15B 2211/615; F15B 21/008; F15B 21/041; Y10T 137/0396; F17D 1/20; F01N 1/10; F01N 1/023; F01N 1/082
See application file for complete search history.

(56) References Cited

U.S. PATENT DOCUMENTS

| | | | | |
|---|---|---|---|---|
| 3,036,656 | A | | 5/1962 | Angelery |
| 3,473,565 | A | | 10/1969 | Blendermann |
| 3,545,565 | A | * | 12/1970 | McCaffrey, Jr. ........ F02B 77/13 123/198 E |
| 4,838,299 | A | * | 6/1989 | Behrens ................. F16L 55/04 137/203 |
| 5,350,888 | A | * | 9/1994 | Sager, Jr. ................ F01N 1/006 181/247 |
| 5,602,368 | A | * | 2/1997 | Kaneso ................... F01N 1/003 181/250 |
| 5,941,283 | A | * | 8/1999 | Forte ................... F16L 55/0331 138/109 |
| 6,073,656 | A | * | 6/2000 | Chen ................. F16L 55/02727 138/26 |
| 6,467,570 | B1 | * | 10/2002 | Herold ..................... F01N 1/02 181/212 |
| 7,278,514 | B1 | * | 10/2007 | Quigley ............ F16L 55/02781 181/212 |
| 7,584,821 | B2 | | 9/2009 | Prior et al. |
| 8,517,057 | B2 | * | 8/2013 | Rose ................... F16L 55/0331 138/26 |
| 9,429,094 | B2 | * | 8/2016 | Newcombe ........... F02D 19/022 |
| 9,625,077 | B2 | * | 4/2017 | Barbolini .............. F16L 55/033 |
| 9,803,790 | B2 | * | 10/2017 | Pestunov ............. F16L 55/045 |
| 2007/0107983 | A1 | * | 5/2007 | Cutting ............ F16L 55/02781 181/249 |
| 2008/0173271 | A1 | | 7/2008 | Prior et al. |
| 2010/0193282 | A1 | | 8/2010 | Kim et al. |

FOREIGN PATENT DOCUMENTS

| | | |
|---|---|---|
| DE | 10 2006 016 937 | 10/2007 |
| DE | 10 2006 033 775 | 12/2007 |
| DE | 101 10 029 | 10/2012 |
| GB | 586018 | 3/1947 |
| WO | 2010/086719 | 8/2010 |

\* cited by examiner

DAMPING DEVICE

FIELD OF THE INVENTION

The invention relates to a damping device, in particular for damping or preventing pressure impacts, such as pulsations, in hydraulic supply circuits. The damping device includes a damping housing surrounding a damping chamber with at least one fluid inlet and a fluid outlet. A damping tube is located in the flow path between the fluid inlet and fluid outlet. The damping tube has at least one branch opening passing through the tube wall and leading to a Helmholtz volume inside of the damping housing in order to form a Helmholtz resonator in a region positioned inside of the length of the damping tube.

BACKGROUND OF THE INVENTION

Damping devices of this type are state of the art. Such hydraulic dampers, which are also known as sound dampers or silencers, serve to reduce vibrations produced by pressure pulsations. Pressure pulsations are periodically applied to a corresponding hydraulic system, in particular as a result of the operation of hydraulic pumps. As is disclosed in document DE 102 17 080 C1, the known damping devices of this type have a damping housing in the form of a circular cylinder. The circular cylinder is rounded in a spherical manner, for example, at both axial end regions, with the fluid inlet and the fluid outlet being located coaxial to the cylinder axis on a respective end region. For the reduction of noise created by vibrations produced by pressure pulsations, which reduction is realized by a Helmholtz resonator, the damping housing is radially expanded at least in regions relative to the damping tube determining the flow direction. A space containing a Helmholtz volume is then formed, which volume the damping tube is connected to via the at least one branch opening.

SUMMARY OF THE INVENTION

On the basis of this prior art, the invention addresses the problem of providing a damping device of the afore-mentioned type, which can be particularly easily and advantageously integrated into existing hydraulic systems.

According to the invention, this problem is basically solved by a damping device having, as a significant distinctive feature of the invention, a fluid filter arranged inside of the damping housing in the flow path running between the fluid inlet and the fluid outlet. This design dispenses with a separate filter device that is normally essential in hydraulic systems for reasons of operational reliability. The integration of the fluid filter into the damping housing permits a particularly compact construction and, at the same time, an increase in operational reliability due to the absence of connecting tubing between the filter and the damper. With a reduction in the overall constructed space being achievable at the same time, the damping device can be used without difficulty even when the available installation space is limited. The damping device according to the invention is then suitable even for mobile applications with particularly constricted space, for example, in hydraulic systems of aircraft or land vehicles.

In particularly advantageous exemplary embodiments, a fluid filter with a circular cylindrical filter element is provided, which is arranged in the damping tube with a cylinder axis coaxial to the damping tube. This arrangement provides a particularly compact construction, with the filter element simultaneously being able to achieve an intensification of the damping effect.

In particularly advantageous exemplary embodiments, the damping housing is formed circular cylindrical and is closed at both ends by housing covers with the fluid inlet or the fluid outlet. On the housing covers, the ends of the damping tube extending coaxial to the cylinder axis are mounted. The damping tube is in a fluidic connection at its one end with the fluid inlet or fluid outlet of the corresponding housing cover, with the other of fluid inlet or fluid outlet of the housing cover being connected to the inside of the damping tube via the filter element.

Particularly advantageously, the filter element is mounted on the housing cover comprising the fluid outlet in such a way that the fluid outlet is connected to the internal filter cavity, which is surrounded by a circular cylindrical filter medium. The outer side of the filter medium adjoins the interior of the damping tube. During operation, the filter element can then be flowed through from the outer side of the filter medium inwards so that, in a manner advantageous for the stability of the filter medium, the dynamic pressure existing during operation acts on the filter medium from the outside to the inside and can be absorbed, for example, via an internal support tube of the filter element.

In particularly advantageous exemplary embodiments, for the purpose of forming a plurality of Helmholtz resonators, the space between the outer side of the damping tube and the inner side of the damping housing is divided into several separate chambers. Each chamber is connected via at least one branch opening in the wall of the damping tube to the interior thereof. This structure allows the damping device to be set in a targeted manner to the damping of various frequencies. This targeting is advantageous, in particular, in the case of variable-speed drives encountered in the hydraulic system, which drives generate a broad frequency range as the excitation spectrum of vibrations.

For a targeted tuning, chambers of different volumes can be provided and/or branch openings with different opening cross sections can be provided.

In this regard, the arrangement can particularly advantageously be such that, in the flow direction coming from the fluid inlet, successive chambers each have decreasing volumes. These decreasing volumes provide resonators, which are successively tuned to lower and then increasingly higher base frequencies. In the flow direction coming from the fluid inlet, the branch openings of successive chambers are preferably each provided with increasing opening cross sections.

For different chamber volumes, chambers are located on a constant external diameter of the damping tube to have different axial lengths. Alternatively, the damping tube can have a stepped external diameter, so that chambers of different radial extension are formed. For the purpose of tuning to low frequencies, the damping tube is preferably able to abut the housing cover comprising the fluid inlet by a length section of reduced diameter.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
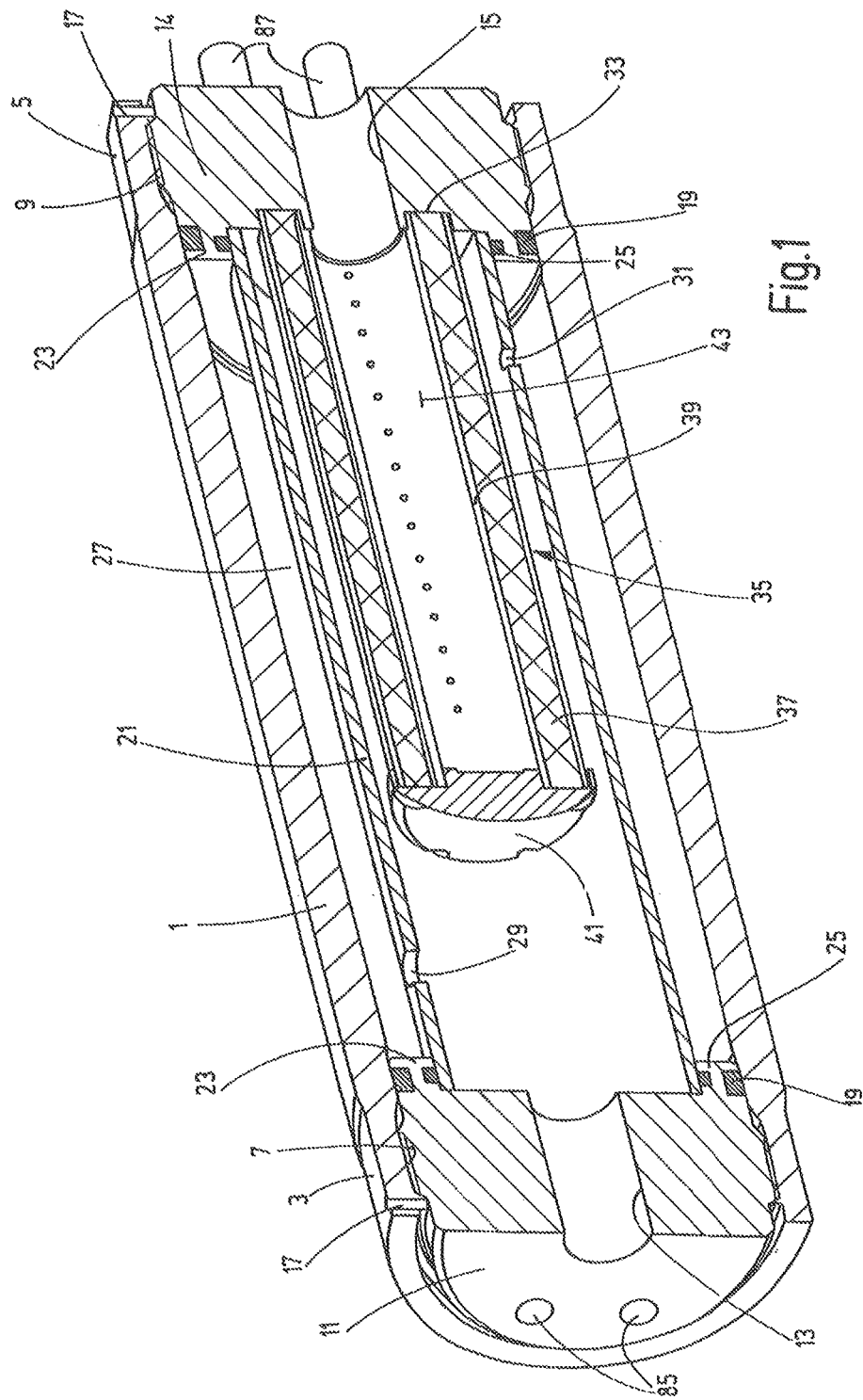
FIG. 1 is a perspective view, in section at a central longitudinal plane, of a damping device according to a first exemplary embodiment of the invention, depicted with approximately half the size of a functional embodiment.

With reference to the attached drawings, the invention is described in detail based on the example of a silencer, which functions according to the principle of a Helmholtz resonator. The exemplary embodiment depicted in FIG. 1 has a damping housing 1 in the form of a circular cylindrical tubular body, which is provided in its two end regions 3 and 5 with an internal thread 7 and 9, respectively. A housing cover 11 is screwed to this internal thread 7 at the end region 3 lying on the left in the drawings. In housing cover 11, a central passage forms a fluid inlet 13 for the supply of a respective fluid with applied pressure pulsations. A housing cover 14 is screwed into the internal thread 9 on the opposite end region 5. Housing cover 14 has a central passage as a fluid outlet 15. Both covers 11 and 14 are similarly formed as cylindrical threaded plugs and are secured by locking pins 17 in the screwed-in state. For the purpose of sealing relative to the damping housing 1, a sealing ring 19 is arranged on the inner end of each cover 11, 14. In the screwed-in state. The outer ends of the covers 11, 14 are substantially flush with the tube ends of the damping housing 1.

In the exemplary embodiment depicted in FIG. 1, a circular cylindrical round damping tube 21 has a constant diameter over its entire length and extends coaxially to the axis of the damping housing 1 between the housing covers 11 and 14. Both housing covers 11 and 14 have, on the inner sides that face one another, an axially projecting peripheral edge 23. On the outer side of each edge 23, the sealing ring 19 for the sealing on the damping housing 1 is located. Each facing end of the damping tube 21 abuts the inner side of the respective peripheral edge 23, with a sealing ring 25 forming the seal. Depending on the radial thickness of the peripheral edges 23, the damping tube 21 is kept at a separation distance from the inner wall of the damping housing 1. By the separation distance, a chamber 27 is created between the outer side of the damping tube 21 and the inner side of the damping housing 1, which chamber 27 forms a Helmholtz volume. For the connection between the interior of the damping tube 21 and the chamber 27, in the tube wall of the damping tube 21 a branch opening 29 is formed in the vicinity of the inlet-side housing cover 11 and a branch opening 31 is formed in the vicinity of the outlet-side housing cover 14. In order to obtain a desired frequency tuning of the formed Helmholtz resonator, the branch opening 29 lying on the left-hand side is provided with a larger opening cross section than the other branch opening 31.

The outlet-side housing cover 14 has an axially recessed, annular groove 33 that is offset from the peripheral edge 23 radially towards the inside, which groove 33 forms the support for a filter element 35 that extends with a circular cylindrical shape coaxially to the cylinder axis on the inside of the damping tube 21 over more than half of the length of said damping tube. The filter element 35 has a hollow cylindrical filter medium 37 that surrounds an inner perforated support tube 39. As is standard in such filter elements, an end cap 41 is provided on the end of the filter element 35 on the left-hand side in the drawings. End cap 41 forms a mounting for the support tube 39 and the filter medium 37. The internal filter cavity 43 located inside the support tube 39 merges directly into the fluid outlet 15 at the outlet-side housing cover 14. In this arrangement, the filter element 35 forms a part of the flow path for the fluid flowing in via the fluid inlet 13 and flowing out via the fluid outlet 15, with that fluid flowing through the filter medium 37 from the outside to the filter cavity 43 that forms the clean side. From filter cavity 43, the fluid exits via the immediately adjacent fluid outlet 15. During this process, the Helmholtz resonator formed by the branch openings 29 and 31 and the chamber 27 produces a noise damping, which is enhanced by the presence of the filter element 35 located on the inside of the damping tube 21.

Figure 2:
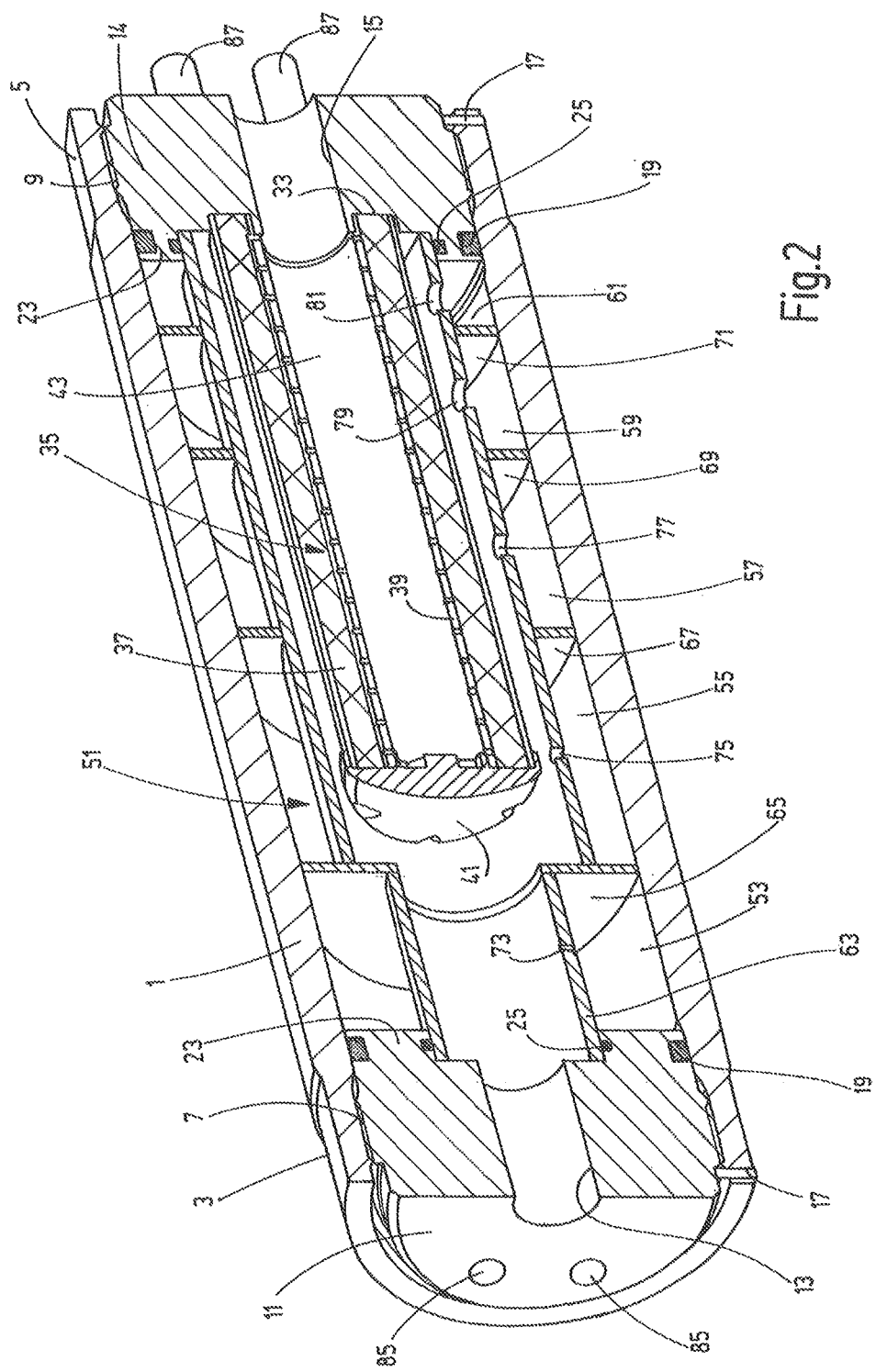
FIG. 2 is a perspective view in section of a damping device according to a second exemplary embodiment of the invention.

The exemplary embodiment of FIG. 2 corresponds to the example of FIG. 1, apart from the fact that, instead of a damping tube with the same diameter throughout, a damping tube 51 with a stepped diameter is provided. Also, the space surrounding the stepped damping tube 51 is divided into several separate chambers 53, 55, 57, 59 and 61, which each form a Helmholtz volume. The damping tube 51 is stepped in such a way that its first length section 63 abutting the inlet-side housing cover 11 has a reduced diameter, while over the remaining part of its length extending to the outlet-side housing cover 14 the damping tube 51 has a constant diameter that corresponds to the diameter of the damping tube 21 of FIG. 1. As FIG. 2 shows, the inlet-side first chamber 53 thus has a greater radial thickness than the other chambers 55, 57, 59 and 61. In the axial direction, the inner end of the first chamber 53 is delimited by an annular disc 65, which at the same time forms one boundary of the following chamber 55. Additional annular discs 67 each form boundaries for the subsequent chambers 55, 57, 59 and 61. For each of the chambers, a branch opening is provided passing through the wall of the damping tube 51. The branch openings are identified from left to right in FIG. 2 with the reference numerals 73, 75, 77, 79 and 81. For targeted tuning of the damping device to desired frequency ranges, both the volumes and the shape of the chambers, which form the Helmholtz volumes for several Helmholtz resonators, are different. As mentioned above, the inlet-side chamber 53 has a greater radial thickness than the following chambers, with each following chamber having the same thickness in this respect. However, the axial length of the first chamber 53 is less than that of the second chamber 55. The axial lengths of the additional chambers 55, 57, 59 and 61 each decrease in the direction of the outlet-side housing cover 14. By contrast, the opening cross sections of the branch openings 73, 75, 77, 79, 81 increase the smaller the volume of the associated chamber. This arrangement results in a tuning to lower tones for the inlet-side first chamber 53, while the subsequent chambers 55, 57, 59, 61 are each tuned to higher tone frequencies. In conjunction with the additional noise damping by the installed filter element 35, a highly efficient damping can be achieved.

For the fastening of the damping device to corresponding third components, four threaded holes 85 for fastening and connecting are provided on the inlet-side housing cover 11 in an arrangement symmetrical to the fluid inlet 13. On the outlet-side housing cover 14 four threaded bolts 87 are provided in a corresponding arrangement relative to the fluid outlet 15. As the figures show, the filter element 35 is connected only to the outlet-side housing cover 14, so that a filter change requires only the removal of a respective housing cover, without having to take the whole damping device out of the system, as blocking of the inflow to the fluid inlet 13 is sufficient.

While various embodiments have been chosen to illustrate the invention, it will be understood by those skilled in the art that various changes and modifications can be made therein without departing from the scope of the invention as defined in the claims.

The invention claimed is:

1. A damping device for damping pulsations in hydraulic circuits, the damping device comprising:
   a damping housing having a fluid inlet and a fluid outlet, said fluid inlet and said fluid outlet defining a flow direction from said fluid inlet to said fluid outlet;
   a damping tube located in said damping housing in a flow path between said fluid inlet and said fluid outlet;
   a space between an outer side of said damping tube and an inner side of said damping housing being divided into plural axially separated damping chambers forming plurality of Helmholtz resonators and being arranged in succession in said flow direction, each of said damping chambers being connected directly in fluid communication to an interior of said damping tube via a constantly open branch opening in a wall of said damping tube, said branch opening of each of said damping chambers having only an increasing opening cross section in said flow direction from each of said damping chambers to a next successive one of said damping chambers; and
   a fluid filter inside said damping tube in said flow path between said fluid inlet and said fluid outlet.

2. A damping device according to claim 1 wherein
   said fluid filter comprises a circular cylindrical filter element arranged coaxially to a longitudinal axis of said damping tube and arranged in said damping tube.

3. A damping device according to claim 1 wherein
   said damping housing is a circular cylinder and is closed on both axial ends thereof by first and second housing covers having said fluid inlet and said fluid outlet, respectively, therein; and
   said damping tube extends coaxially to a cylinder axis of said damping housing and has opposite axial ends are mounted on the housing covers, said damping tube being in fluid communication with said fluid inlet at one axial end of said damping tube and with said fluid outlet at an opposite axial end of said damping tube, said fluid inlet or said fluid outlet being connected in fluid communication with said interior of said damping tube via said filter element.

4. A damping device according to claim 3 wherein
   said fluid filter is mounted on said second housing cover with said fluid outlet connected to an internal filter cavity surrounded by a hollow cylindrical filter medium of said fluid filter, an outside of said hollow cylindrical filter medium adjoining said interior of said damping tube.

5. A damping device according to claim 1 wherein
   each of said damping chambers has a different volume.

6. A damping device according to claim 5 wherein
   each successive one of said damping chambers has a decreasing volume in said flow direction.

7. A damping device according to claim 3 wherein
   said damping tube has a stepped external diameter and abuts said first housing cover by a length section of reduced diameter compared to other sections of said damping tube, said length section of reduced diameter defining one of said damping chambers closest to said fluid inlet.

8. A damping device according to claim 1 wherein
   said damping tube has only a single branch opening in each of said damping chambers.

9. A damping device for damping pulsations in hydraulic circuits, the damping device comprising:
   a damping housing having a fluid inlet and a fluid outlet, said fluid inlet and said fluid outlet defining a flow direction from said fluid inlet to said fluid outlet;
   a damping tube located in said damping housing in a flow path between said fluid inlet and said fluid outlet;
   a space between an outer side of said damping tube and an inner side of said damping housing being divided into plural axially separated damping chambers forming plurality of Helmholtz resonators and being arranged in succession in said flow direction, each successive one of said damping chambers having a different decreasing volume in said flow direction, each of said damping chambers being directly connected in fluid communication to an interior of said damping tube via a single constantly open branch opening in a wall of said damping tube, said branch opening of each said damping chambers having only an increasing opening cross section in said flow direction from each of said damping chambers to a next successive one of said damping chambers; and
   a fluid filter inside said damping tube in said flow path between said fluid inlet and said fluid outlet.

10. A damping device according to claim 9 wherein
    said fluid filter comprises a circular cylindrical filter element arranged coaxially to a longitudinal axis of said damping tube and arranged in said damping tube.

11. A damping device according to claim 9 wherein
    said damping housing is a circular cylinder and is closed on both axial ends thereof by first and second housing covers having said fluid inlet and said fluid outlet, respectively, therein; and
    said damping tube extends coaxially to a cylinder axis of said damping housing and has opposite axial ends are mounted on the housing covers, said damping tube being in fluid communication with said fluid inlet at one axial end of said damping tube and with said fluid outlet at an opposite axial end of said damping tube, said fluid inlet or said fluid outlet being connected in fluid communication with said interior of said damping tube via said filter element.

12. A damping device according to claim 11 wherein
    said fluid filter is mounted on said second housing cover with said fluid outlet connected to an internal filter cavity surrounded by a hollow cylindrical filter medium of said fluid filter, an outside of said hollow cylindrical filter medium adjoining said interior of said damping tube.

13. A damping device according to claim 12 wherein
    said damping tube has a stepped external diameter and abuts said first housing cover by a length section of reduced diameter compared to other sections of said damping tube, said length section of reduced diameter defining one of said damping chambers closest to said fluid inlet.

14. A damping device according to claim 12 wherein
    said internal fluid cavity of said fluid filter is closed by an unperforated end cap on an end of said fluid cavity remote from said second housing cover.

15. A damping device for damping pulsations in hydraulic circuits, the damping device comprising:
    a damping housing surrounding a damping chamber and having a fluid inlet and a fluid outlet, said fluid inlet and said fluid outlet defining a flow direction from said fluid inlet to said fluid outlet with a hydraulic fluid flowing through said damping housing from said fluid inlet to said fluid outlet;

a damping tube located in said damping housing in a flow path between said fluid inlet and said fluid outlet, said damping tube having a branch opening extending radially through a tube wall of said damping tube and connected to a Helmholtz volume inside said damping housing forming Helmholtz resonator positioned inside a length of said damping tube;

a fluid filter element inside said damping tube in said flow path between said fluid inlet and said fluid outlet, said fluid filter element having a hollow cylindrical filter medium with a cylinder axis coaxial to said damping tube, said filter medium surrounding an inner perforated support tube, said fluid flowing through said filter medium from an outside surface of said filter medium to an inside clean surface of said filter medium, said support tube having an inner cavity with a first end thereof merging directly into and being in direct fluid communication with said fluid outlet; and an unperforated end cap on and closing a second end of said filter element opposite said first end preventing said fluid from passing through said second end.

16. A damping device according to claim 15 wherein said damping housing is a circular cylinder and is closed on both axial ends thereof by first and second housing covers having said fluid inlet and said fluid outlet, respectively, therein; and said damping tube extends coaxially to a cylinder axis of said damping housing and has opposite axial ends are mounted on the housing covers, said damping tube being in fluid communication with said fluid inlet at one axial end of said damping tube and with said fluid outlet at an opposite axial end of said damping tube, said fluid outlet being connected in fluid communication with said interior of said damping tube via said filter element.

\* \* \* \* \*